United States Patent [19]

Instance

[11] Patent Number: 4,830,406

[45] Date of Patent: May 16, 1989

[54] LABELS AND MANUFACTURE THEREOF

[76] Inventor: David J. Instance, Guinea Hall, Sellindge, Kent, England

[21] Appl. No.: 119,914

[22] Filed: Nov. 13, 1987

[30] Foreign Application Priority Data

Nov. 17, 1986 [GB] United Kingdom ................ 8627410

[51] Int. Cl.[4] ........................ B42D 15/00; B41L 1/14; B41L 1/20; B32B 3/04

[52] U.S. Cl. .................................... 283/81; 282/9 A; 282/11.5 A; 428/40

[58] Field of Search .................... 283/81, 71; 282/3 B, 282/9 A, 11.5 A, 27 A, 1 R, 1 A; 281/5; 229/92.1, 92.2, 92.3; 428/40, 306, 312

[56] References Cited

U.S. PATENT DOCUMENTS

| | | | |
|---|---|---|---|
| 2,120,159 | 6/1938 | Stevens | 282/9 A |
| 2,120,160 | 6/1938 | Stevens | 282/9 A |
| 2,127,081 | 8/1938 | Brown | 40/7 |
| 3,204,987 | 9/1965 | Fann | 282/25 |
| 4,281,762 | 12/1936 | Hattemer | 206/390 |
| 4,323,608 | 4/1982 | Denny et al. | 283/81 |
| 4,429,827 | 2/1984 | Murray | 283/71 |
| 4,491,495 | 1/1985 | Muscoplat | 428/40 |
| 4,592,572 | 6/1986 | Instance | 428/40 |
| 4,605,292 | 8/1986 | McIntosh | 428/40 |
| 4,625,909 | 12/1986 | Ferrando | 282/11.5 A |

FOREIGN PATENT DOCUMENTS

| | | | |
|---|---|---|---|
| 1030178 | 4/1978 | Canada | 283/81 |
| 0043179 | 1/1982 | European Pat. Off. | 3/2 |
| 0087987 | 9/1983 | European Pat. Off. | 3/2 |
| 0130053 | 1/1985 | European Pat. Off. | 3/2 |
| 0161914 | 11/1985 | European Pat. Off. | 3/2 |
| 0201353 | 12/1986 | European Pat. Off. | 3/2 |
| 2402264 | 3/1984 | France | 283/81 |
| WO 86/04551 | 8/1986 | PCT Int'l Appl. | 15/ |

*Primary Examiner*—Frank T. Yost

*Assistant Examiner*—Paul M. Heyrana, Sr.

*Attorney, Agent, or Firm*—Bernard, Rothwell & Brown

[57] ABSTRACT

A label for attachment to a product, the label comprising a longitudinal strip which is divided into a series of panels by a plurality of transverse fold lines, the strip being folded about the transverse fold lines so that the panels of the strip overlie one another, the folded strip having a pair of weakened tear lines which extend through the overlying panels and which divide the folded strip into a central portion and two opposed longitudinal edge portions, a support web which is coated on its rear face with a layer of pressure-sensitive adhesive and which is adhered by the self-adhesive rear face to a backing of release material, and a pair of opposed adhesive bands for adhering the respective two opposed longitudinal edge portions of the folded strip to the front face of the support web, the strip being maintained in a folded configuration when the strip is adhered to the support web and the central portion being removable from the support web and the adhered longitudinal edge portions by tearing along the weakened tear lines. The invention also provides a method of producing such a label.

10 Claims, 1 Drawing Sheet

FIG. 1
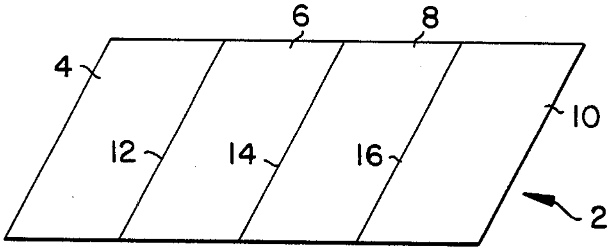
FIG. 2
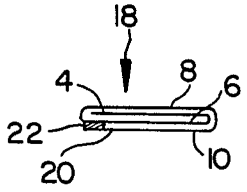
FIG. 3
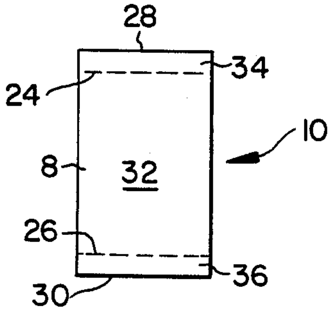
FIG. 4
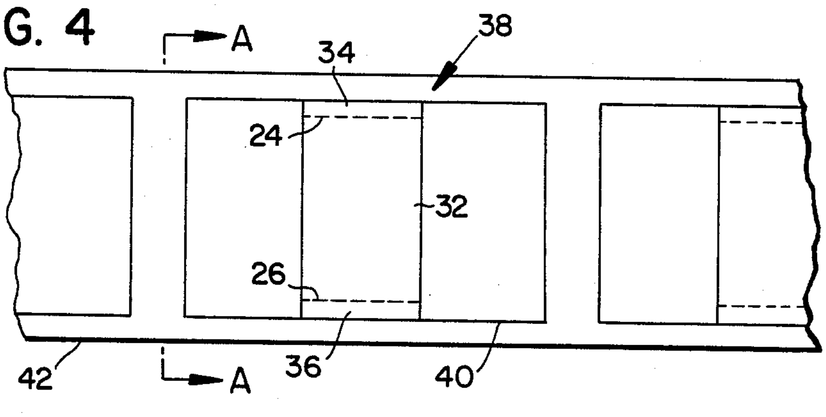
FIG. 5
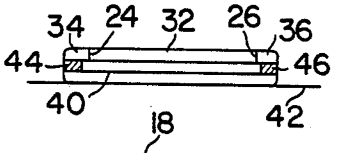
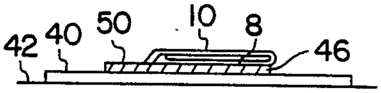
FIG. 7
FIG. 6
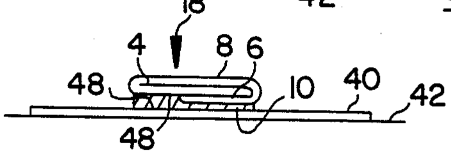

LABELS AND MANUFACTURE THEREOF

BACKGROUND OF THE INVENTION

The present invention relates to a label and to a method of producing labels.

It is frequently desirable to attach to a product a label which is in a folded configuration and which can be unfolded to reveal previously hidden surfaces which are printed with information relating to the product.

The present invention aims to provide such a label and a method for producing such a label.

SUMMARY OF THE INVENTION

Accordingly, the present invention provides a label for attachment to a product, the label comprising a longitudinal strip which is divided into a series of panels by a plurality of transverse fold lines, the strip being folded about the transverse fold lines so that the panels of the strip overlie one another, the folded strip having a pair of weakened tear lines which extend through the overlying panels and which divide the folded strip into a central portion and two opposed longitudinal edge portions, a support web which is coated on its rear face with a layer of pressure-sensitive adhesive and which is adhered by the self-adhesive rear face to a backing of release material, and a pair of opposed adhesive bands for adhering the respective two opposed longitudinal edge portions of the folded strip to the front face of the support web, the strip being maintained in a folded configuration when the strip is adhered to the support web and the central portion being removable from the support web and the adhered longitudinal edge portions by tearing along the weakened tear lines.

The present invention also provides a method of producing labels for attachment to a product, the method comprising the steps of:

(a) providing a folded longitudinal strip which is divided into a series of panels by a plurality of transverse fold lines and has been folded about the transverse fold lines so that the panels of the strip overlie one another;

(b) forming in the strip a pair of weakened tear lines which in the folded strip extend through the overlying panels and divide the folded strip into a central portion and two opposed longitudinal edge portions;

(c) providing a support web which is coated on its rear face with a layer of pressure-sensitive adhesive and which is adhered by the self-adhesive rear face to a backing of a release material; and (d) adhering the two opposed longitudinal edge portions of the folded strip to the front face of the support web by a pair of respective opposed adhesive bands, the strip being maintained in a folded configuration when the strip is adhered to the support web and the central portion being removable from the support web and the adhered longitudinal edge portions by tearing along the weakened tear lines.

Preferably, the strip is folded in turn about successive transverse fold lines so that the folded strip is in the form of a flattened tube.

In the preferred arrangement, the label further comprises a layer of adhesive which adheres the free edge of the free end panel of the folded strip to the panel against which the free end panel is folded thereby to maintain the strip in a folded configuration.

In an alternative preferred embodiment, the free end panel of the strip is shorter in the longitudinal direction than the panel against which the free end panel is folded thereby to expose an overlapping portion of the said panel and the free end panel and the overlapping portion are adhered to the support web by the pair of opposed adhesive bands thereby to maintain the strip in a folded configuration.

In a further alternative preferred arrangement, the free end panel of the folded strip is longer in the longitudinal direction than the remaining panels of the strip whereby a flap portion of the free end panel extends past the remainder of the strip and the flap portion and that panel which is adjacent the free end panel are adhered to the support web by the pair of opposed bands of adhesive thereby to maintain the strip in a folded configuration.

BRIEF DESCRIPTION OF THE DRAWINGS

Embodiments of the present invention will now be described by way of example only with reference to the accompanying drawings, in which:

FIG. 1 is a perspective view of a longitudinal strip of paper, which forms part of a label in accordance with a first embodiment of the present invention;

FIG. 2 is a side view of the strip of FIG. 1 when folded and adhered to form a flattened tube;

FIG. 3 is a plan view of the folded strip of FIG. 2 which has been provided with lines of perforations;

FIG. 4 is a plan view of a series of labels in accordance with the first embodiment of the present invention carried on a length of release backing material, each of the labels incorporating the folded strip of FIG. 3;

FIG. 5 is an end view along the line A—A of FIG. 4 of one of the labels of FIG. 4 carried on the length of release backing material;

FIG. 6 is a side view of a label in accordance with a second embodiment of the present invention; and FIG. 7 is a side view of a label in accordance with a third embodiment of the present invention.

DESCRIPTION OF THE PREFERRED EMBODIMENTS

Referring to FIG. 1, a longitudinal strip 2 of paper is divided into a series of panels 4, 6, 8, 10 by a plurality of transverse fold lines 12, 14, 16. The panels 4, 6, 8, 10 have substantially the same dimensions. The strip 2 is folded successively about the transverse fold lines 12, 14, 16 and in the same direction so as to form a flattened tube 18 which is shown in FIG. 2. The inner face of the free end 20 of the end panel 10 (the fourth panel) which is on the outside of the flattened tube 18 is adhered by a band of adhesive 22 to the opposing outer face of that panel which is adjacent to the other end panel 4 (the second panel). In this way, the flattened tube 18 is held in its folded configuration by the band of adhesive 22.

Referring to FIG. 3, the flattened tube 18 is povided with two weakened tear lines 24, 26 such as lines of perforations, which extend longitudinally along the strip 2 through each of the panels 4, 6, 8, 10 and are spaced from the respective longitudinal edges 28, 30 of the strip 2. The weakened tear lines 24, 26 thus divide the flattened tube 18 into a major central portion 32 which is bounded by two minor longitudinal edge portions 34, 36. The weakened tear lines 24, 26 are preferably formed after the strip 2 has been folded by perforating the folded strip 2 in one action through each of the four overlaid panels 4, 6, 8, 10.

The perforation step may be carried out either before or after the end panel 10 has been adhered to the second panel 6 by the band of adhesive 22.

FIGS. 4 and 5 show a label 38 in accordance with the present invention. The label 38 is formed by adhering the end panel 10 of the flattened tube 18 to the front face of a support web 40 which is coated on its rear face by a layer of pressure-sensitive adhesive (not shown) and is carried on a backing of a release material 42. Only those parts of the end panel 10 which are comprised in the two longitudinal edge portions 34, 36 are adhered to the support web 40 by respective adhesive bands 44, 46 and the central portion 32 is not adhered directly to the support web 40.

In use, the label 38 is peeled off the release backing material 42 and is adhered by the self-adhesive support web 40 to a surface to be labelled, e.g. a container. The folded strip 2 is printed with information relating to the product which is labelled. When it is desired to access that information, a user removes the central portion 32 from the label 18 by tearing along the two weakened tear lines 24, 26, leaving the two longitudinal edge portions 34, 36 still adhered to the support web 40. The central portion 32 can then be unfolded and its contents read by the user. That part of the support web 40 which is initially covered by the central portion 32 may be printed with desired information or images and that printing is revealed when the central portion 32 is torn off as aforesaid. In addition, those parts of the support web 40 which initially are on either side of the central portion 32 may be printed with desired information or images.

In order to make the label 18 of the present invention, the longitudinal strip 2 is printed and then folded as described above along the transverse fold lines 12, 14, 16 to form the flattened tube 18. The flattened tube 18 is then perforated to form the two weakened tear lines 24, 26 and the fourth panel adhered to the second panel 6 by the band of adhesive 22. The peforation step may alternatively be carried out after the fourth panel 10 has been adhered to the second panel 6.

The resultant perforated and adhered flattened tube 18 is then adhered to a support web 40 to make the labels of the present invention.

In a first preferred arrangement, the labels of the present invention are made by either of the methods which are disclosed in British Patent Specification No. 2127378 published on Apr. 11th 1984 in the name of David J. Instance.

In those methods, a length of pressure-sensitive stock, consisting of an elongate web of self-adhesive paper which is carried on a backing of release material 42 is passed, in turn, through a die-cutting station at which a succession of support webs 40 are cut from the elongate web and through an adhesive applying station at which a succession of pairs of adhesive bands 44, 46 are applied to the succession of support webs 40. The part of the elongate web which is outside the support webs 40 is removed as a waste web remnant either before or after the adhesive applying station. The succession of support webs 40 on the release backing material 42 then passes through a flattened tube applying station at which a succession of the flattened tubes 18 are applied to the succession of support webs 40 so that each flattened tube 18 is adhered to a repective support web by a respective pair of adhesive bands 44, 46. Each flattened tube 18 is aligned with respect to the respective support web 40 to which it is adhered so that the adhesive bands 44, 46 adhere the respective longitudinal edge portions 34, 36 to the support web 40. The resultant labels 36 on the release backing material 42 are wound up onto a reel from which they may subsequently be removed for application to containers.

In a second preferred arrangement, the labels of the present invention are made by a method which is similar to the method which is disclosed in my British Patent specification No. 2122968 published on Jan. 25 1984 in the name of David J. Instance.

In the preferred method, a length of pressure-sensitive stock, consisting of an elongate web of self-adhesive paper which is carried on a backing of release material 42 is passed through an adhesive applying station at which a succession of pairs of adhesive bands 44, 46 are applied to a succession of areas of the elongate web which correspond to respective support webs 40. The pressure-sensitive stock is then passed to a flattened tube applying station at which a succession of the flattened tubes 18 are applied to the succession of the said areas of the elongate web. Each flattened tube 18 is aligned with respect to the respective area to which it is adhered so that in each resultant label the adhesive bands 44, 46 adhere the respective longitudinal edge portions 34, 36 to the support web 40. The elongate web/flattened tube assembly then passes through a die-cutting station at which a succession of support webs 40 are cut from the elongate web by a die-cutter, each support web 40 corresponding to a respective one of the said areas of the elongate web. If desired, the die-cutter may also cut through the flattened tubes 18 thereby to cut away from each flattened tube 18 the free longitudinal edge of each of the longitudinal edge portions 34, 36 so that in the resultant label 38 the outer edge of each longitudinal edge portion 34, 36 coincides with the edge of that portion of the support web 40 to which it is adhered by the respective adhesive band 44, 46. The part of the elongate web which is outside the support webs 40, and, if appropriate, the cut-away parts of the longitudinal edge portions are removed as a waste web remnant after the die-cutting station. The resultant labels 38 on the release backing material 42 are wound up onto a reel from which they may subsequently be removed for application to containers.

In an alternative embodiment of the present invention which is shown in FIG. 6, it is not necessary to adhere the fourth and second panels 10, 16 of the strip 1 by the band of adhesive 22. This is achieved by making the length of the fourth panel 10 in the longitudinal direction of the strip 2 less than that of the remaining panels 4, 6, 8, whereby an overlapping portion 48 of the second panel 6 is exposed so that the rear face of each of the longitudinal edge portions 34, 36 consists of respective edge parts of the fourth panel 10 and respective edge parts of the overlapping portion 48 of the second panel 6. In this way, when the longitudinal edge portions 34, 36 are adhered to the support web 40 the flattened tube 18 is maintained in its folded configuration. The central portion 31 may be removed from the support web 40 by tearing along the two weakened tear lines 24, 26.

In another alternative embodiment of the present invention which is shown in FIG. 7, the strip 2 is not adhered by the band of adhesive 22. Instead, the free end panel 10 is longer in the longitudinal direction of the strip 2 than each of the remaining panels 4, 6, 8 so that when the strip 2 is folded a flap portion 50 of the free end panel 10 extends past the remainder of the strip 2. The flap portion 50 and the third panel 8 are adhered by their respective longitudinal edge portions 34, 36 to the support web 40 by the adhesive bands 44, 46, thereby to maintain the strip 2 in a folded configuration. The central portion 32 may be removed from the support web 40 by tearing along the two weakened tear lines 24, 26.

In a further alternative embodiment of the present invention the band of adhesive 22 is omitted and the flattened tube 18 is maintained in its folded configuration by layers of adhesive which are provided in the region of the longitudinal edge portions 34, 36 and thereby adhere the various panels 4, 6, 8, 10 of the strip 2 together. The layers of adhesive are formed by applying to the strip 2 prior to the folded step two lines of adhesive along the respective two longitudinal edges 28, 30. When the strip 2 is folded as described above, the lines of adhesive adhere together adjacent folded panels so that in the flattened tube 18 the longitudinal edge portions consist of the adhered together edges of the panels of the strip 2.

What I claim is:

1. A label for attachment to a product, the label comprising a longitudinal strip which is divided into a series of panels by a plurality of transverse fold lines, the strip being folded about the transverse fold lines so that the panels of the strip overlie one another, the folded strip having a pair of weakened tear lines which extend through the overlying panels and which divide the folded strip into a central portion and two opposed longitudinal edge portions, a support web which is coated on its rear face with a layer of pressure-sensitive adhesive and which is adhered by the self-adhesive rear face to a backing of release material, and a pair of opposed adhesive bands for adhering the respective two opposed longitudinal edge portions of the folded strip to the front face of the support web, the strip being maintained in a folded configuration when the strip is adhered to the support web and the central portion being removable from the support web and the adhered longitudinal edge portions by tearing along the weakened tear lines.

2. A label according to claim 1 wherein the strip is folded in turn about successive transverse fold lines so that the folded strip is in the form of a flattened tube.

3. A label according to claim 2 further comprising a layer of adhesive which adheres the free edge of the free end panel of the folded strip to the panel against which the free end panel is folded thereby to maintain the strip in a folded configuration.

4. A label according to claim 2 wherein the free end panel of the strip is shorter in the longitudinal direction than the panel against which the free end panel is folded thereby to expose an overlapping portion of the said panel and the free end panel and the overlapping portion are adhered to the support web by the pair of opposed adhesive bands thereby to maintain the strip in a folded configuration.

5. A label according to claim 2 wherein the free end panel of the folded strip is longer in the longitudinal direction than the remaining panels of the strip whereby a flap portion of the free end panel extends past the remainder of the strip and the flap portion and that panel which is adjacent the free end panels are adhered to the support web by the pair of opposed bands of adhesive thereby to maintain the strip in a folded configuration.

6. A method of producing labels for attachment to a product, the method comprising the steps of:

(a) providing a folded longitudinal strip which is divided into a series of panels by a plurality of transverse fold lines and has been folded about the transverse fold lines so that the panels of the strip overlie one another;

(b) forming in the strip a pair of weakened tear lines which in the folded strip extend through the overlying panels and divide the folded strip into a central portion and two opposed longitudinal edge portions;

(c) providing a support web which is coated on its rear face with a layer of pressure-sensitive adhesive and which is adhered by the self-adhesive rear face to a backing of a release material; and (d) adhering the two opposed longitudinal edge portions of the folded strip to the front face of the support web by a pair of respective opposed adhesive bands, the strip being maintained in a folded configuration when the strip is adhered to the support web and the central portion being removable from the support web and the adhered longitudinal edge portions by tearing along the weakened tear lines.

7. A method according to claim 6 wherein the strip is folded in turn about successive transverse fold lines so that the folded strip is in the form of a flattened tube.

8. A method according to claim 7 further comprising the step of applying a layer of adhesive to the free end edge of the free end panel of the folded strip, which layer of adhesive adheres that free end edge to the panel against which the free end panel is folded thereby to maintain the strip in a folded configuration.

9. A method according to claim 7 wherein the free end panel of the strip is shorter in the longitudinal direction than the panel against which the free end panel is folded thereby exposing an overlapping portion of the said panel and the free end panel and the overlapping portion are adhered to the support web by a pair of opposed adhesive bands thereby maintaining the strip in a folded configuration.

10. A method according to claim 7 wherein the free end panel of the folded strip is longer in the longitudinal direction than the remaining panels of the strip thereby extending a flap portion of the free end panel past the remainder of the strip and the flap portion and that panel which is adjacent the free end panel are adhered to the support web by the pair of opposed bands of adhesive thereby maintaining the strip in a folded configuration.

* * * * *

UNITED STATES PATENT AND TRADEMARK OFFICE
CERTIFICATE OF CORRECTION

PATENT NO. : 4,830,406

DATED : MAY 16, 1989

INVENTOR(S) : DAVID J. INSTANCE

It is certified that error appears in the above-identified patent and that said Letters Patent is hereby corrected as shown below:

Column 1, line 67 delete "embodiment" and insert therefor -- arrangement --;

Column 2, line 57 delete "povided" and insert therefor -- provided --;

Column 5, line 14 delete "folded" and insert therefor -- folding --.

Signed and Sealed this

Seventeenth Day of April, 1990

*Attest:*

HARRY F. MANBECK, JR.

*Attesting Officer*

*Commissioner of Patents and Trademarks*